(12) United States Patent
Fan et al.

(10) Patent No.: US 10,203,560 B2
(45) Date of Patent: Feb. 12, 2019

(54) METHOD FOR MANUFACTURING LIQUID CRYSTAL DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yuguang Fan, Beijing (CN); Shichao Wang, Beijing (CN); Jian Li, Beijing (CN); Changyong Gong, Beijing (CN); Jingpeng Li, Beijing (CN); Xiuliang Wang, Beijing (CN); Zhenyu Xie, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 33 days.

(21) Appl. No.: 15/504,275

(22) PCT Filed: Jun. 22, 2016

(86) PCT No.: PCT/CN2016/086743
§ 371 (c)(1),
(2) Date: Feb. 15, 2017

(87) PCT Pub. No.: WO2017/161718
PCT Pub. Date: Sep. 28, 2017

(65) Prior Publication Data
US 2018/0164626 A1 Jun. 14, 2018

(30) Foreign Application Priority Data
Mar. 25, 2016 (CN) .......................... 2016 1 0179299

(51) Int. Cl.
*G02F 1/1339* (2006.01)
*G02F 1/1333* (2006.01)
(Continued)

(52) U.S. Cl.
CPC ........ *G02F 1/13394* (2013.01); *G02F 1/1333* (2013.01); *G02F 1/1337* (2013.01); *G02F 1/1341* (2013.01)

(58) Field of Classification Search
CPC .... G02F 1/1337; G02F 1/1333; G02F 1/1341; G02F 1/13394
(Continued)

(56) References Cited

U.S. PATENT DOCUMENTS 3,947,375 A * 3/1976 Gray .................... C07C 205/06
252/299.62
4,837,745 A * 6/1989 Eich ........................ G02F 1/132
349/183

(Continued)

FOREIGN PATENT DOCUMENTS

CN 1637482 A 7/2005
CN 101893778 A 11/2010
(Continued)

OTHER PUBLICATIONS

English translation of the International Search Report and Written Opinion dated Aug. 29, 2016, for corresponding PCT Application No. PCT/CN2016/086743.
(Continued)

Primary Examiner — Hoan C Nguyen
(74) Attorney, Agent, or Firm — Kinney & Lange, P.A.

(57) ABSTRACT

The embodiments of the present disclosure provide a method for manufacturing a liquid crystal display device which includes a liquid crystal panel, and the method includes transforming the liquid crystal in a liquid crystal
(Continued)

panel into a solid state before processing the liquid crystal panel, and transforming the liquid crystal in the liquid crystal panel into a liquid state after the liquid crystal panel is processed. In the method, the liquid crystal in a liquid crystal panel is transformed into a solid state before processing the liquid crystal panel, which can greatly enhance the pressure resistance of the liquid crystal panel, and prevent the pressure in the processing from breaking the liquid crystal panel.

11 Claims, 4 Drawing Sheets

(51) Int. Cl.
  *G02F 1/1337* (2006.01)
  *G02F 1/1341* (2006.01)
(58) Field of Classification Search
  USPC .......................................................... 349/20
  See application file for complete search history.

(56) References Cited

U.S. PATENT DOCUMENTS

| | | | |
|---|---|---|---|
| 4,844,824 A * | 7/1989 | Mermelstein | C11D 1/65 510/321 |
| 6,650,393 B1 | 11/2003 | Nishiguchi | |
| 6,842,211 B2 | 1/2005 | Katsura | |
| 7,626,678 B2 | 12/2009 | Yang et al. | |
| 2002/0051112 A1 | 5/2002 | Katsura | |
| 2006/0147810 A1* | 7/2006 | Koch | G03F 7/001 430/1 |

FOREIGN PATENT DOCUMENTS

| | | | |
|---|---|---|---|
| CN | 103698907 | * | 4/2014 |
| CN | 103698907 A | | 4/2014 |
| CN | 103913900 A | | 7/2014 |
| CN | 105607327 A | | 5/2016 |
| JP | 2002341307 A | * | 11/2002 |
| JP | 2006227630 A | * | 8/2006 |
| TW | 200639488 A | | 11/2006 |

OTHER PUBLICATIONS

International Search Report and Written Opinion (including English translation of Box V) dated Aug. 29, 2016, for corresponding PCT Application No. PCT/CN2016/086743.
First Chinese Office Action, for Chinese Patent Application No. 201610179299.0, dated May 29, 2018, 12 pages.

* cited by examiner

METHOD FOR MANUFACTURING LIQUID CRYSTAL DISPLAY DEVICE

CROSS-REFERENCE TO RELATED APPLICATION

This application claims the benefit of Chinese Patent Application No. 2016101792990 filed on Mar. 25, 2016 in the State Intellectual Property Office of China, the whole disclosure of which is incorporated herein by reference.

BACKGROUND

Technical Field

The present disclosure relates to a technical field of liquid crystal display, and especially to a method for manufacturing a liquid crystal display device.

Description of the Related Art

A liquid crystal panel, especially a TFT-LCD, currently, is only one kind of display device that can catch up with and even surpass a CRT in comprehensive performances such as brightness, contrast, power consumption, service life, volume and weight. Its excellent performance, well characteristics for large-scale production, and a high degree of automation, raw materials of low cost and broad development space make it become the mainstream of the display products.

A certain pressure is required to exert when the liquid crystal panel is subject to processes such as polishing and thinning, polarizer attachment, touch screen attachment, backlight source assembling, touch screen attachment. However, such a pressure may cause the liquid crystal panel to rupture, resulting in an irreparable loss.

In addition, the applicant has found that the probability of occurrence of a Zara (bright spot) in an ultra-thin liquid crystal panel subjected to a polishing and thinning process is greatly increased as compared with a conventional liquid crystal panel, and a liquid crystal panel with a Zara will be downgraded or eliminated. Zara bright spot phenomenon mainly refers to a phenomenon that some small bright spots are formed densely in a certain area of the liquid crystal panel.

SUMMARY

In view of the above-described technical problems, embodiments of the present disclosure provide a method for manufacturing a liquid crystal display device, which enhances the pressure resistance of a liquid crystal panel.

According to an aspect of the present disclosure, there is provided a method for manufacturing a liquid crystal display device which comprises a liquid crystal panel. The method comprises the steps as follows transforming the liquid crystal in a liquid crystal panel into a solid state before processing the liquid crystal panel; and transforming the liquid crystal in the liquid crystal panel into a liquid state after processing the liquid crystal panel.

According to an embodiment of the present disclosure, the method of the present disclosure further comprises cooling the liquid crystal panel so as to transform the liquid crystal therein from the liquid state to the solid state; processing the liquid crystal panel and maintaining the liquid crystal in the liquid crystal panel in the solid state during the processing; and recovering the liquid crystal in the liquid crystal panel from the solid state to the liquid state and making the liquid crystal sufficiently reorientate after the completion of processing.

According to an embodiment of the present disclosure, in the method of the present disclosure, the step of cooling the liquid crystal panel comprises cooling the liquid crystal panel to a supercooled state in which a temperature of the liquid crystal panel is lower by a value equal to or more than 10° C. than a temperature at which the liquid crystal is transformed into the solid state.

According to an embodiment of the present disclosure, in the method of the present disclosure, cooling the liquid crystal panel to a supercooled state comprises placing and cooling the liquid crystal panel in a low-temperature environment.

According to an embodiment of the present disclosure, in the method of the present disclosure, the temperature of the low-temperature environment is from −90° C. to −30° C.

According to an embodiment of the present disclosure, in the method of the present disclosure cooling the liquid crystal panel to a supercooled state comprises spraying on a surface of the liquid crystal panel a substance which is able to produce a low temperature in a room temperature environment.

According to an embodiment of the present disclosure, in the method of the present disclosure, the substance is liquid nitrogen or dry ice.

According to an embodiment of the present disclosure, in the method of the present disclosure, the step of processing the liquid crystal panel comprises, transferring the liquid crystal panel to an operation station and during the processing, continuing to cool the liquid crystal panel by the operation station so as to keep the liquid crystal contained in the liquid crystal panel in the solid state.

According to an embodiment of the present disclosure, in the method of the present disclosure, the operation station is a metal platform on which one or more adsorption and buffer members are arranged to adsorb the liquid crystal panel; and a cooling medium circulation path or accommodation chamber is provided inside the metal platform and a cooling medium is introduced into the cooling medium circulation passage or the accommodation chamber during and/or before the processing.

According to an embodiment of the present disclosure, in the method of the present disclosure, the step of recovering the liquid crystal in the liquid crystal panel from the solid state to the liquid state and making the liquid crystal sufficiently reorientate comprises: heating the liquid crystal panel to a heating temperature and holding the temperature of the liquid crystal panel for a preset time, wherein the heating temperature is from 90° C. to 200° C., and the preset time is from 5 min to 2 hours.

According to an embodiment of the present disclosure, in the method of the present disclosure, the processing includes: substrate polishing, polarizer attachment, touch screen attachment, and/or backlight source assembling.

According to an embodiment of the present disclosure, in the method of the present disclosure, the processing is substrate polishing, and during processing the liquid crystal panel, the liquid crystal in solid state has an anchoring effect on a photoresist pillar in an enclosed space, such that a friction force subjected by a force point on the top end of the photoresist pillar changes from a dynamic sliding friction force to a static friction force, improving an anti-sliding ability of the surface of the liquid crystal panel, and reducing the probability of generation of debris at the top end of the photoresist pillar.

It can be seen from the technical solutions described above, the method for manufacturing a liquid crystal display device according to embodiments of the present disclosure has the following advantageous effects:

Cooling the liquid crystal in a liquid crystal panel to a solid state before processing the liquid crystal panel will greatly enhance the pressure resistance of the liquid crystal panel, and prevent the pressure in the process from breaking the liquid crystal panel. The process includes, for example, polarizer attachment, touch screen attachment, backlight source assembling or touch screen attachment;

Cooling the liquid crystal in a liquid crystal panel to a solid state before polishing the liquid crystal panel will result in that the liquid crystal in solid state has an anchoring effect on a photoresist pillar in an enclosed space, such that a friction force subjected by a force point on each of the top ends of the photoresist pillar and the sealing frame of the panel changes from a dynamic sliding friction force to a static friction force, improving an anti-sliding ability of the surface of the liquid crystal panel, and reducing the probability of generation of PI debris as well as the risk of creation of Zara bright spots.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS

Figure 1:
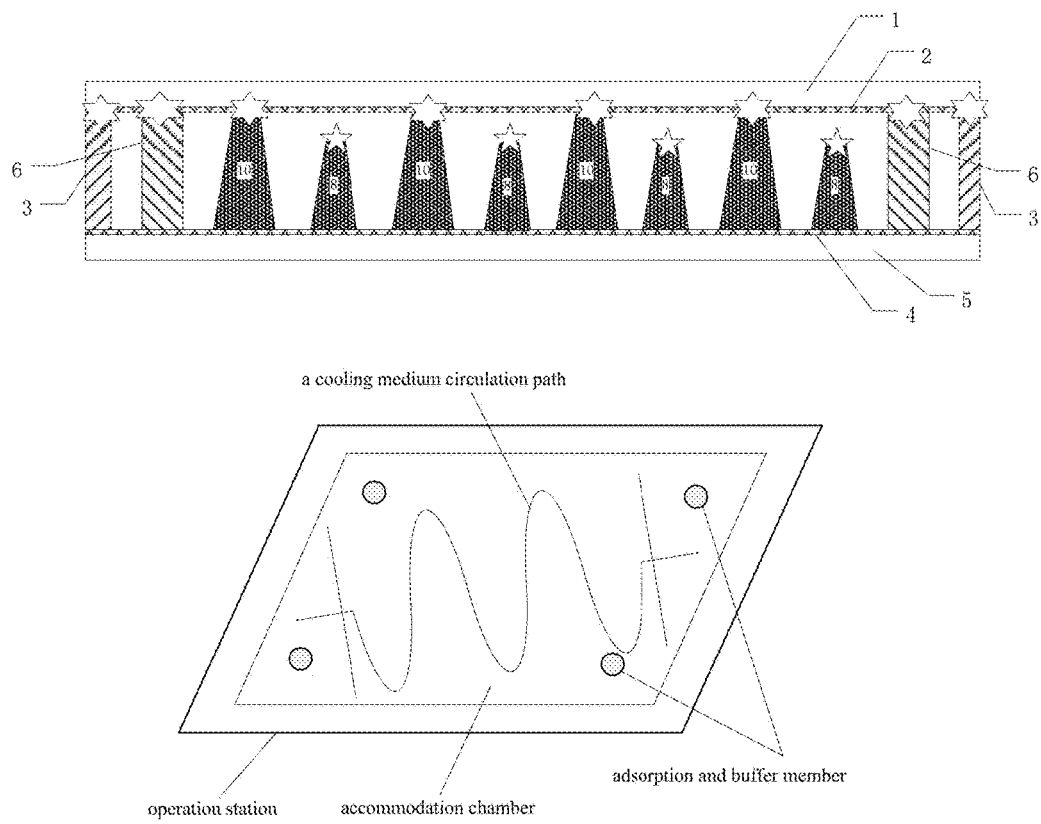
FIG. 1 is a schematic view of a longitudinal section of a liquid crystal panel.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In an embodiment of the present disclosure, cooling the liquid crystal in a liquid crystal panel to a solid state will result in that, on one hand, the liquid crystal in solid state has an anchoring effect on photoresist pillars in an enclosed space, greatly enhancing the pressure resistance of the surface of the liquid crystal panel, and on the other hand, a friction force subjected by a force point on each of the top ends of the photoresist pillar and the sealant of the panel changes from a dynamic sliding friction force to a static friction force, such that the surface of a PI (polyimide) layer is not susceptible to be damaged, PI debris generated due to a polishing friction will be reduced accordingly, and the risk of generating Zara bright spots will also be reduced.

For a better understanding of the objects, solutions and advantages of the present disclosure, the present disclosure will be further described in detail below with reference to exemplary embodiments in combination with the accompanying drawings.

Firstly, the reasons why a Zara bright spot appears in an ultra-thin liquid crystal panel are studied and analyzed. FIG. 1 is a schematic view of a longitudinal section of a liquid crystal panel. As shown in FIG. 1, the liquid crystal panel includes a TFT substrate 1 and a CF (Color Filter) substrate 5 which are disposed opposite to each other with a distance therebetween. Edge portions of the TFT substrate and the CF substrate are enclosed by a Dummy adhesive 3. A panel sealant 6 is provided on the inner side of the dummy adhesive, thereby an enclosed space is formed between the TFT substrate and the CF substrate. A first PI (polyimide) layer 2 is fixed to the inner side of the TFT substrate. A second PI layer 4 is fixed to the inner side of the CF substrate. The enclosed space is filled with liquid crystal therein. In order to ensure the uniformity of the thickness of the enclosed space, a plurality of higher main photoresist pillars (Main PS) 10 and a plurality of lower sub-photoresist pillars (Sub PS) 8 are arranged between the first PI layer 2 and the second PI layer 4. The lower end of the main photoresist pillar 10 is fixed to the second PI layer 4 and its top end is directly in contact with the first PI layer 2. The lower end of the sub-photoresist pillar 8 is fixed to the second PI layer 4 and its top end is spaced from the first PI layer 2 by a distance.

In a polishing and thinning process of an ultra-thin liquid crystal panel, a lower set plate is used to adsorb a glass substrate, and an upper set plate which is provided with an abrasion resistant material keeps rotating such that a display screen is polished. Alternatively, it is also possible that the upper set plate is used to adsorb the glass substrate and the lower set plate may rotate to perform polishing similarly.

Please further refer to FIG. 1, top ends of the Dummy adhesive 3, the panel sealant 6, and the main photoresist pillar 10 are in direct contact with the first PI layer 2, and are force points of a first type when the TFT substrate 1 is polished and thinned. This type of force points may provide friction resistance, which are presented with hexagonal stars in FIG. 2. Top ends of the sub-photoresist pillars 8 are not in direct contact with the first PI layer 2, and hence are force points of a second type, which may only provide frictional resistance and are presented with five-pointed star in FIG. 2. As the number of the force points is relatively small, all the friction forces that can be generated are dynamic sliding friction forces.

The sliding resistance of the liquid crystal panel is low in the case of dynamic sliding friction force, so that the friction forces produced by the relative movement of the main photoresist pillar 10 and the secondary photoresist post 8 with respect to the first PI layer are relatively serious and thus some PI chips are generated. These PI debris are scattered in the liquid crystal and are shown as bright spots during the display screen is powered, which explains why the probability is increased significantly that bright spots are presented in an ultra-thin liquid crystal panel which has been subjected to a polishing and thinning process.

The following is a detailed description of the solutions of the present application, taking the polishing process in the method for manufacturing a liquid crystal display device as an example.

Figure 2:
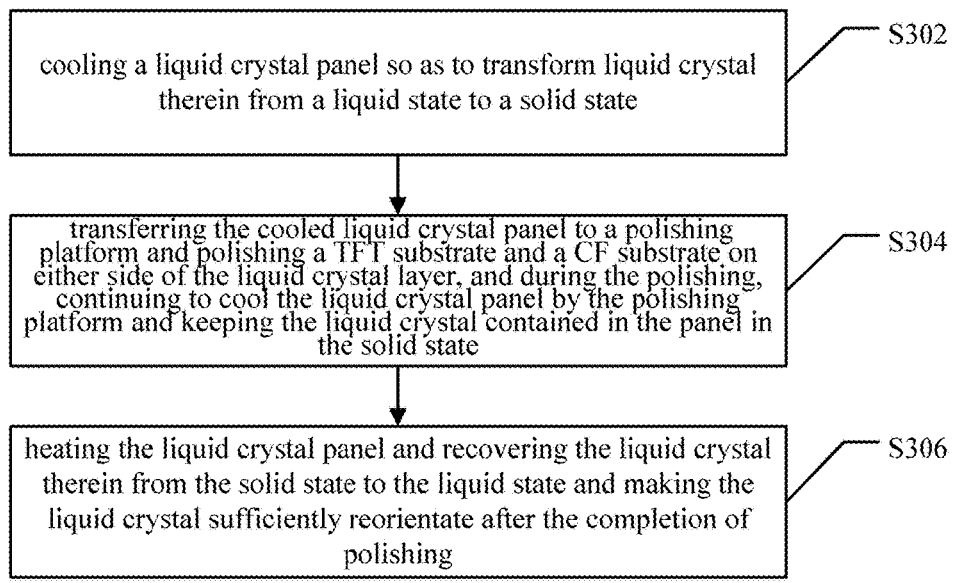
FIG. 2 is a flow chart showing a process of polishing a liquid crystal panel according to a first embodiment of the present disclosure.

Please refer to FIG. 2, the polishing process of a liquid crystal panel according to an embodiment comprises following steps:

Step S302: cooling the liquid crystal panel so as to transform the liquid crystal therein from a liquid state to a solid state;

Generally, a temperature at which the liquid crystal transform from the liquid state to the solid state is from −10° C. to −60° C. In the present disclosure, it is preferable to use a super-cooling method for cooling the liquid crystal panel. That is, cooling the liquid crystal panel to a supercooled state, that is, cooling it to a temperature which is lower by a value equal to or more than 10° C. than the temperature at which the liquid crystal is transformed into the solid state so as to ensure that the liquid crystal panel does not liquefy in the polishing process.

In an embodiment, cooling the liquid crystal panel includes spraying on the surface of the liquid crystal panel a substance which can produce a low temperature in a room temperature environment, so as to rapidly cool the liquid crystal panel, thereby cooling the liquid crystal in the liquid crystal panel into a solid state.

The substance which can produce a low temperature in a room temperature environment may be a substance that achieves a cooling effect in the room temperature environment by absorbing heat through a morphological change, such as liquid nitrogen, dry ice. In an embodiment, it is preferable to use liquid nitrogen. Liquid nitrogen as a better refrigerant can be obtained by compressing air, which can be obtained from a wide range of material, and can also reduce the cost. It will be appreciated that in practice, a substance which can reduce temperature by morphological changes in a room temperature environment, such as liquids or solids, may be used as the substance which can produce a low temperature in the embodiments of the present disclosure.

In another embodiment of the present disclosure, cooling the liquid crystal panel may further include placing the liquid crystal panel in a low-temperature environment to cooling it. For a liquid crystal panel with strict cleanliness requirements, it is also possible to place the liquid crystal panel in a low temperature environment to perform an isolated cooling. That is, the liquid crystal panel is placed in a clean container which can perform heat exchange, such that the liquid crystal panel is cooled in a low-temperature environment through heat exchange with the outside. By placing the liquid crystal panel in a container for isolated cooling, a problem may be avoided that the substance which can produce a low temperature, such as liquid nitrogen, will cause secondary pollution on the liquid crystal panel.

The cooling temperature in the low temperature environment is in a range between −90° C. and −30° C., preferably −50° C. A container containing the liquid crystal panel is placed in a low-temperature environment such that the temperature of the liquid crystal panel is reduced and the liquid crystal therein is cooled to a solid state.

It is to be understood that the method for cooling a liquid crystal panel is not limited to the method provided in the two embodiments described above, and may be selected by the person skilled in the art according to the actual needs in production.

The method further comprises Step S304: transferring the cooled liquid crystal panel to a polishing platform and polishing the TFT substrate and the CF substrate on either side of the liquid crystal layer. In the polishing process, the polishing platform continues to cool the liquid crystal panel and keep the liquid crystal contained in the panel in the solid state.

In an embodiment, the polishing platform is a metal platform, on which one or more adsorption and buffer members are arranged to adsorb the liquid crystal panel. The metal platform mainly plays a role of heat conduction. The adsorption and buffer member functions to adsorb and protect the liquid crystal panel, and may be a suction disk or an adsorption cushion. In the case of a suction disk, it is possible to arrange a plurality of suction disks at suitable positions on the metal platform, while in the case of an adsorption cushion, it may be a one-piece adsorption cushion. The suction disk or adsorption cushion is secured in place on the metal platform.

In an embodiment, a cooling medium circulation path is provided inside the metal platform. During and/or before the polishing process, the cooling medium is introduced into the cooling medium circulation path so that the metal platform is kept at a low temperature, and the heat generated during the polishing process is conducted to the cooling medium and removed from the metal platform by the cooling medium.

In another embodiment of the present disclosure, the metal platform internally comprises an accommodation chamber in which a cooling medium is filled. In the present embodiment, however, the cooling medium is not circulated, but is refilled after consumption.

It should be noted that in the above embodiments, in the step S302 an advance cooling is performed to the liquid crystal panel, while in step S304, the liquid crystal panel is continued to be cooled in the polishing process. It will be understood by those skilled in the art that, the present disclosure will also be achieved if the liquid crystal panel is cooled in either of these two steps, for example:

the liquid crystal panel is cooled in step S302, and is not cooled any more during the polishing process in step S304.

If this solution is adopted, it is necessary to reduce the cooling temperature of the liquid crystal panel sufficiently in step S302, so that the liquid crystal in the solid state does not recover to the liquid state even during polishing process, or it is ensured that the polishing process is sufficiently rapid, such that the polishing process is finished before the solid liquid crystal recovers to the liquid state.

(2) the step S302 and the step S304 are combined into one step, that is, the cooling of the liquid crystal panel in step S302 is performed on the polishing platform.

If such a technical solution is employed, it is necessary to adsorb the liquid crystal panel to the metal platform before the actual polishing step is started in step S304, and to conduct cold to the liquid crystal from the metal platform such that the contained liquid crystal is transformed into a solid state.

Please refer to FIG. 1, the liquid crystal in the solid state has a physical anchoring effect in an enclosed space, such that a friction force subjected by a force point on each of the top ends of of the main photoresist pillar and the sealant 6 of the panel changes from a dynamic sliding friction force to a static friction force, significantly improving an anti-sliding ability of the surface of the liquid crystal panel. In addition, since the static friction force is greater than the dynamic friction force, the PI surface doesn't tend to be damaged, and the PI debris generated by the friction is reduced and the risk of forming the Zara bright spots is also reduced.

The method further comprises Step S306: heating the liquid crystal panel such that the liquid crystal therein recovers from the solid state to the liquid state and sufficiently reorientate.

In an embodiment, the polished liquid crystal panel is placed in an enclosed container, and the temperature in the enclosed container is gradually increased. In an example, the enclosed container may be an oven.

In an embodiment, the liquid crystal in the solid state is subject to further high-temperature aging under 120° C. for an hour to ensure a sufficient reorientation of the liquid crystal. It is understood that time and temperature for the high temperature aging can be adjusted according to the actual situation, generally, the heating temperature is from 90° C. to 200° C., and the holding time is from 5 min to 2 hours to prevent a negative effect on the quality of liquid crystal.

In this step, it is to be noted that the step S306 is merely for the purpose of recovering the liquid crystal in the liquid crystal panel to a liquid state. However, it will be understood by those skilled in the art that after the polishing is finished, if no more cold is conducted to the liquid crystal panel, liquid crystal in the liquid crystal panel will naturally absorb heat around it and recovers to the liquid state under the room temperature. Accordingly, the step S306 may be replaced by "no more cold is conducted to the liquid crystal panel", or the liquid crystal in the liquid crystal panel may recover to the liquid state after the subsequent processes of polarizer attachment and the backlight source assembling are completed.

In the following, schemes of the present invention will be specifically described with reference to the polarizer attachment process in the method for manufacturing a liquid crystal display device:

It is necessary to attach a front polarizer and a rear polarizer after the polishing to the TFT substrate and the CF substrate of the liquid crystal panel is finished. In order to squeeze out air between the polarizer and the substrate, and prevent generation of bubbles, it is necessary to apply a certain pressure on the polarizer, and this pressure is very likely to lead to breakage of liquid crystal panels.

In a second exemplary embodiment of the present disclosure, there is also provided a process of attaching a polarizer of a liquid crystal panel.

Figure 3:
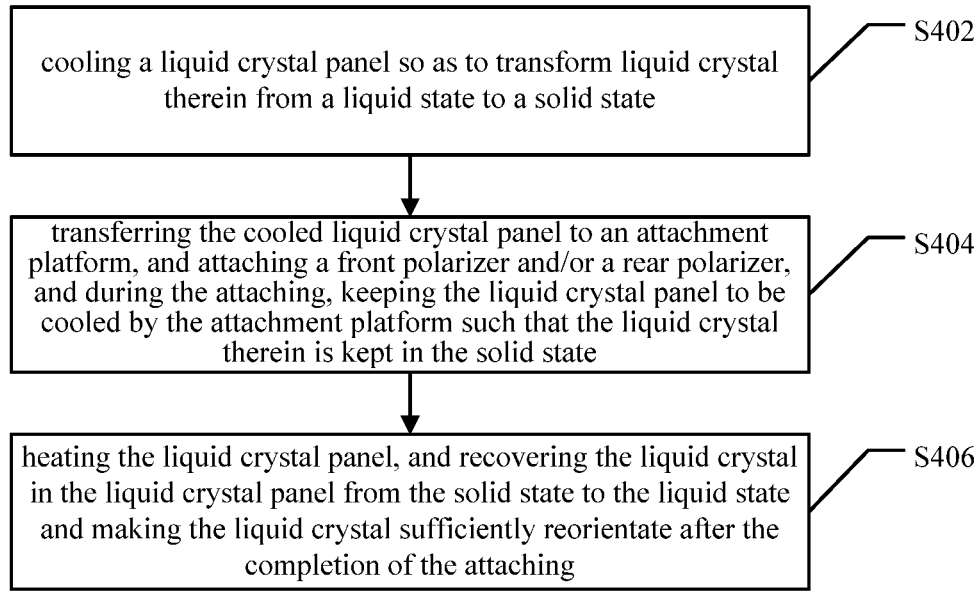
FIG. 3 is a flow chart showing a process of attaching a polarizer of a liquid crystal panel according to a second embodiment of the present disclosure.

Referring to FIG. 3, the process of attaching a polarizer of a liquid crystal panel according to the present embodiment comprises the following steps:

Step S402: cooling the liquid crystal panel so as to transform the liquid crystal therein from the liquid state to the solid state;

Step S404: transferring the cooled liquid crystal panel to an attachment platform, and attaching the front polarizer and/or the rear polarizer; during the attachment process, the liquid crystal panel is kept to be cooled by the attachment platform, such that the liquid crystal therein is kept in a solid state; and Step S406: heating the liquid crystal panel to recover the liquid crystal in the liquid crystal panel from the solid state to the liquid state and make the liquid crystal sufficiently reorientate after the attaching.

In the present embodiment, the liquid crystal in the liquid crystal panel is kept in a solid state during the polarizer attachment process, so that the pressure resistance of the liquid crystal panel may be greatly improved, which prevents the liquid crystal panel from being broken by the pressure during the attachment process.

The following is a detailed description of the solution of the present application taking the touch screen attachment process in a method for manufacturing a liquid crystal display device as an example.

In a third exemplary embodiment of the present disclosure, there is also provided a process of attaching a touch screen of a liquid crystal panel.

A touch screen is needed to be attached after the TFT substrate and the CF substrate of the liquid crystal panel have been polished. Also, in order to squeeze out air between the touch screen and the polarizer so as to prevent generation of bubbles, it is necessary to apply a certain pressure on the touch screen, and this pressure is very likely to lead to a breakage of the liquid crystal panel.

Figure 4:
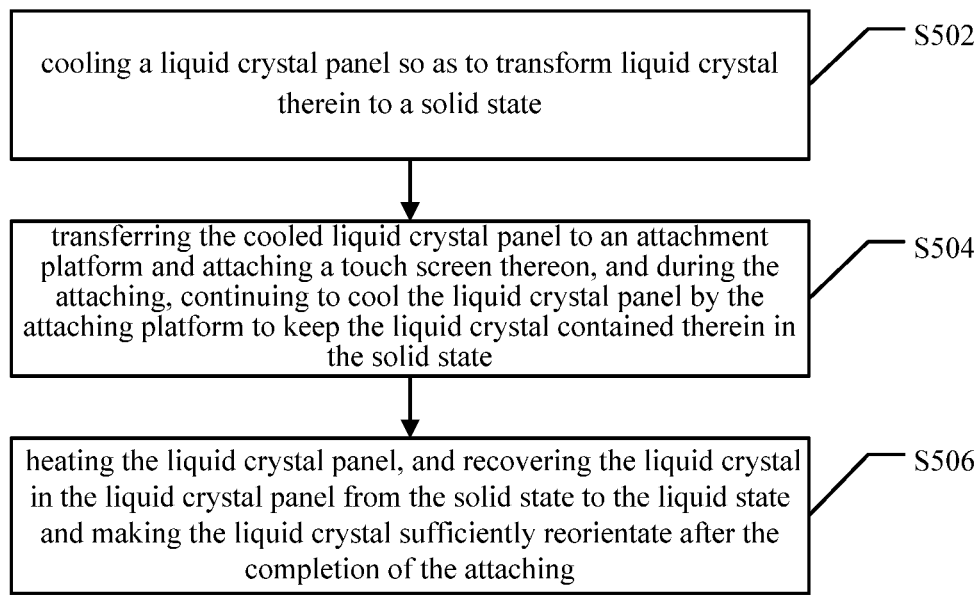
FIG. 4 is a flow chart showing a process of attaching a touch screen of a liquid crystal panel according to a third embodiment of the present disclosure.

Referring to FIG. 4, a process of attaching a touch screen of a liquid crystal panel according to the present embodiment comprises the following steps:

Step S502: cooling the liquid crystal panel so as to transform the liquid crystal therein to the solid state;

Step S504: transferring the cooled liquid crystal panel to the attaching platform and attaching a touch screen thereon; the attaching platform continues to cool the liquid crystal panel to keep the contained liquid crystal in the solid state during the attaching; and Step S506: heating the liquid crystal panel to recover the liquid crystal in the liquid crystal panel from the solid state to the liquid state and make the liquid crystal sufficiently reorientate after the attaching.

In the present embodiment, the liquid crystal in the liquid crystal panel is kept in a solid state during the touch screen attachment process, so that the pressure resistance of the liquid crystal panel may be greatly improved, which prevents the liquid crystal panel from being broken by the pressure during the attachment process.

The following is a detailed description of the solution of the present application taking the backlight source assembling process in a method for manufacturing a liquid crystal display device as an example.

In a fourth exemplary embodiment of the present disclosure, there is also provided a process of assembling a backlight source of a liquid crystal panel.

A backlight source is needed to be assembled after the TFT substrate and the CF substrate of the liquid crystal panel have been polished. During this process, it is necessary to apply a certain pressure to the backlight source, and this pressure is very likely to lead to breakage of the liquid crystal panel.

Figure 5:
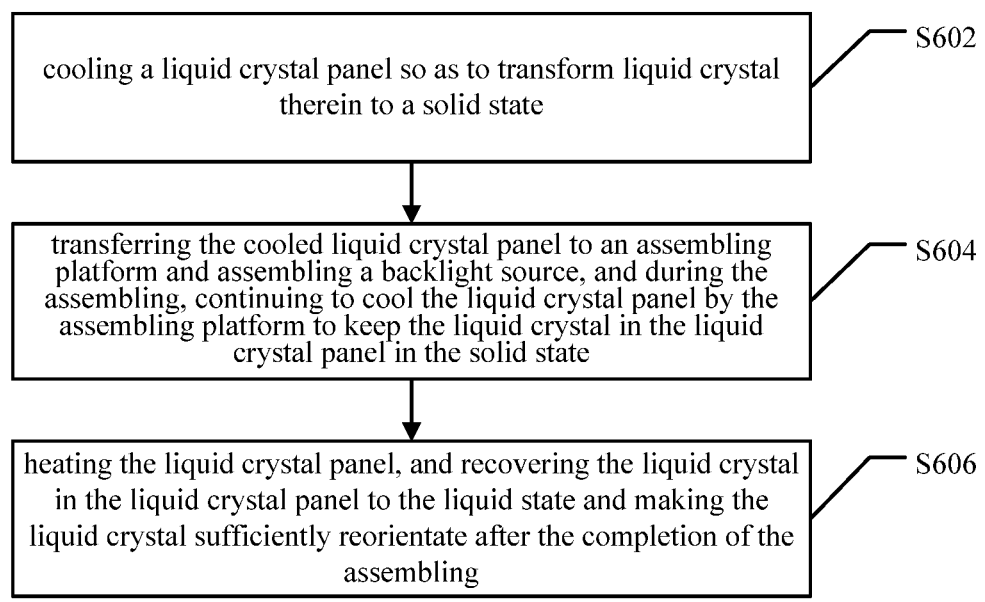
FIG. 5 is a flow chart showing a process of assembling a backlight source of a liquid crystal panel according to a fourth embodiment of the present disclosure.

Referring to FIG. 5, a process of assembling a backlight source of a liquid crystal panel according to the present embodiment comprises the following steps:

Step S602: cooling the liquid crystal panel so as to transform the liquid crystal therein to the solid state;

Step S604: transferring the cooled liquid crystal panel to an assembling platform and assembling the backlight source; during the assembling, the assembling platform continues to cool the liquid crystal panel to keep the contained liquid crystal in the solid state; and Step S606: heating the liquid crystal panel to recover the liquid crystal in the liquid crystal panel to the liquid state and make the liquid crystal sufficiently reorientate after the assembling.

In the present embodiment, the liquid crystal in the liquid crystal panel is kept in a solid state during the backlight source assembling process, so that the pressure resistance of the liquid crystal panel may be greatly improved, which prevents the liquid crystal panel from being broken by the pressure during the assembling process.

It is to be noted that, for the purpose of brevity, any technical feature of the above-described embodiments which can be used in the same application may be incorporated herein and will not be repeatedly described here.

Figure 6:
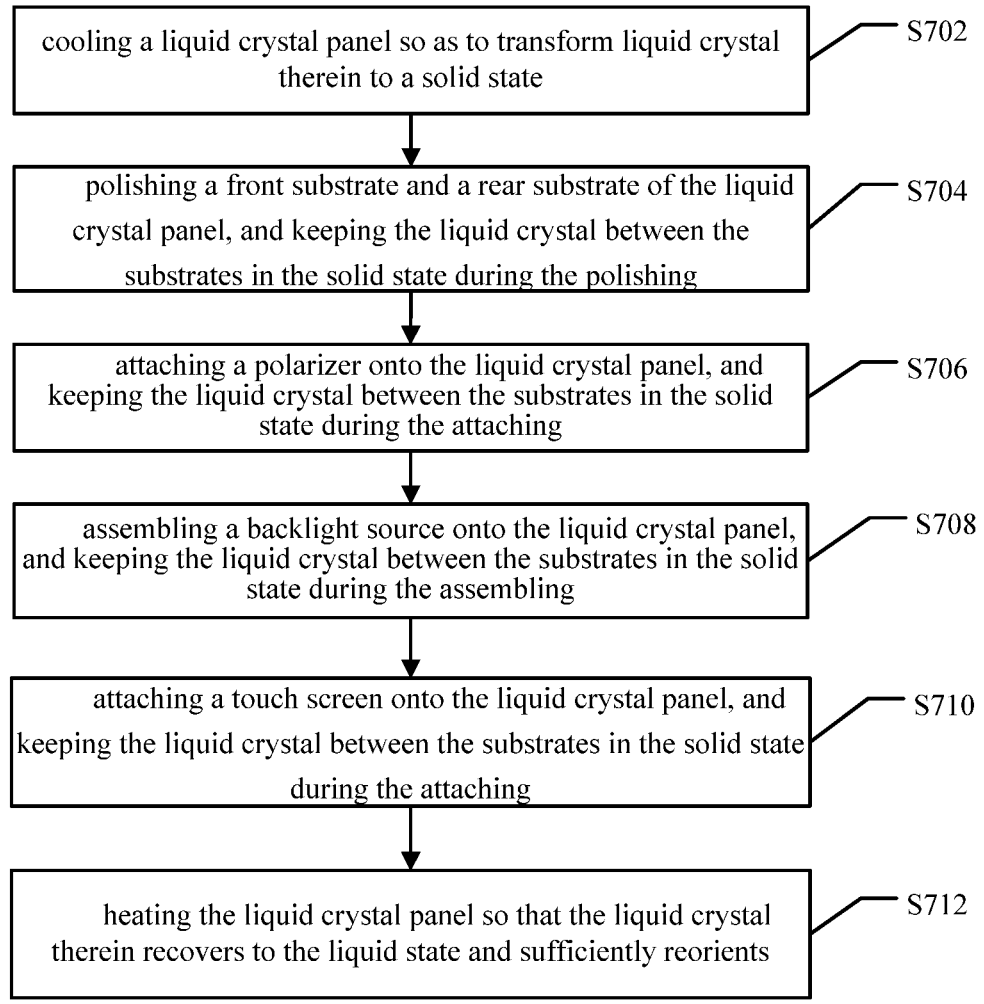
FIG. 6 is a flow chart showing a process of assembling a backlight source of a liquid crystal panel according to a fifth embodiment of the present disclosure.

In combination with the above mentioned four embodiments, according to a fifth exemplary embodiment of the present disclosure, there is also provided a method for manufacturing a liquid crystal panel. Referring to FIG. 6, the method includes:

Step S702: cooling the liquid crystal panel so as to transform the liquid crystal therein to the solid state;

Step S704: polishing a front substrate and a rear substrate of the liquid crystal panel, and keeping the liquid crystal between the substrates in a solid state during the polishing;

Step S706: attaching a polarizer onto the liquid crystal panel, and keeping the liquid crystal between the substrates in a solid state during the attaching;

Step S708: assembling a backlight source onto the liquid crystal panel, and keeping the liquid crystal between the substrates in the solid state during the assembling;

Step S710: attaching a touch screen onto the liquid crystal panel, and keeping the liquid crystal between the substrates in the solid state during the attaching; and Step S712: heating the liquid crystal panel so that the liquid crystal therein recovers to the liquid state and sufficiently reorients.

In the present embodiment, the liquid crystal in the liquid crystal panel is kept in a solid state during processing the liquid crystal panel, so that the force resistance of the liquid crystal panel may be greatly improved, which prevents the liquid crystal panel from being broken.

It should be noted that the present disclosure is only described taking some specific processes as examples, such as substrate polishing, polarizer attachment, backlight source assembling, touch screen attachment, etc. However, it will be understood by those skilled in the art that, in each step of processing the liquid crystal panel, the method of cooling the liquid crystal to a solid state may be adopted as long as it is necessary to increase the pressure resistance of the panel, reduce flow ability of the liquid crystal in the panel, and reduce the dynamic friction in the liquid crystal panel, which should be included within the scope of the present disclosure.

Heretofore, five embodiments of the present disclosure have been described in detail with reference to the accompanying drawings. From the above description, those skilled in the art will clearly understand the method of manufacturing a liquid crystal panel of the present disclosure.

It is to be noted that, in the drawings or the specification, those implementations not described or described are known to those skill in the art and are not described in detail. In addition, the above-described definitions of the various elements and methods are not limited to the specific structures, shapes or modes mentioned in the embodiments, and can be simply modified or replaced by those skilled in the art, for example:

The present disclosure may provide an example of a parameter that contains a specific value, it is not necessarily that the parameter is exactly equal to the corresponding value, but may be approximated to the corresponding value within an acceptable tolerance or design constraint;

The directional terms mentioned in the embodiments, such as "upper", "lower", "front", "rear", "left", "right", are directions only viewed with reference to the drawings and are not intended to limit the protection scope of the present disclosure;

The order of the above steps is not limited to those listed above, and may be varied or rearranged depending on the design requirement, unless otherwise specified or except for steps that must be performed sequentially;

The embodiments described above may be used in combination with each other or in combination with other embodiments based on design and reliability considerations, i.e., the technical features of the different embodiments may be freely combined to form more embodiments.

In summary, the present application discloses adopting the low temperature cooling method to cool the liquid crystal in the liquid crystal panel to the solid state, thus greatly improving the pressure resistance of the liquid crystal panel, which can be used for the processes such as polishing, polarizer attachment, backlight source assembling and touch screen attachment. In addition, in the polishing process, the frictional force between the CF substrate and the TFT substrate can be increased, and the Zara bright spots caused by the friction between the photoresist pillar and the TFT substrate can be reduced, and the quality of the liquid crystal panel is improved, rendering a good application prospect.

Purposes, technical solutions and advantageous effects of the present disclosure have been described above in detail in exemplary embodiments. It will be understood that the above description is merely made with reference to exemplary embodiments of the present disclosure and is not intended to limit the present disclosure, and various changes, equivalents and modifications made without departing from the principles and spirit of the disclosure fall within scopes of the present invention.

What is claimed is:

1. A method for manufacturing a liquid crystal display device which comprises a liquid crystal panel, wherein the method comprises:

transforming liquid crystal in the liquid crystal panel into a solid state before processing the liquid crystal panel; and transforming the liquid crystal in the liquid crystal panel into a liquid state after processing the liquid crystal panel;

wherein the processing comprises substrate polishing; and wherein during processing the liquid crystal panel, the liquid crystal in the solid state has an anchoring effect on the photoresist pillar in an enclosed space, such that a friction force subjected by a force point on a top end of the photoresist pillar changes from a dynamic sliding friction force to a static friction force, improving an anti-sliding ability of the surface of the liquid crystal panel, and reducing the probability of generation of debris at the top end of the photoresist pillar.

2. The method according to claim 1, further comprising:

cooling the liquid crystal panel so as to transform the liquid crystal therein to the solid state;

processing the liquid crystal panel and keeping the liquid crystal in the liquid crystal panel in the solid state during the processing; and recovering the liquid crystal in the liquid crystal panel from the solid state to the liquid state and making the liquid crystal reorientate after completion of the processing.

3. The method according to claim 2, wherein cooling the liquid crystal panel comprises cooling the liquid crystal panel to a supercooled state in which a temperature of the liquid crystal panel is at least 10° C. lower than a temperature at which the liquid crystal is transformed into the solid state.

4. The method according to claim 3,
wherein cooling the liquid crystal panel to the supercooled state comprises placing and cooling the liquid crystal panel in a low-temperature environment.

5. The method according to claim 4,
wherein the low-temperature environment has a temperature from −90° C. to −30° C.

6. The method according to claim 3,
wherein cooling the liquid crystal panel to the supercooled state comprises spraying on a surface of the liquid crystal panel a substance which is able to produce a low temperature in a room temperature environment.

7. The method according to claim 6,
wherein the substance is liquid nitrogen or dry ice.

8. The method according to claim 2, wherein processing the liquid crystal panel comprises:
transferring the liquid crystal panel to an operation station and during the processing, continuing to cool the liquid crystal panel by the operation station so as to keep the liquid crystal contained in the liquid crystal panel in the solid state.

9. The method according to claim 8,
wherein the operation station is a metal platform on which one or more adsorption and buffer members are arranged to adsorb the liquid crystal panel; and
wherein a cooling medium circulation path or accommodation chamber is provided inside the metal platform and a cooling medium is introduced into the cooling medium circulation passage or the accommodation chamber during and/or before the processing.

10. The method according to claim 2, wherein recovering the liquid crystal in the liquid crystal panel from the solid state to the liquid state and making the liquid crystal reorientate comprises:
heating the liquid crystal panel to a heating temperature and holding a temperature of the liquid crystal panel for a preset time, wherein the heating temperature is from 90° C. to 200° C., and the preset time is from 5 minutes to 2 hours.

11. The method according to claim 1, wherein the processing includes:
substrate polishing, polarizer attachment, touch screen attachment, and/or backlight source assembling.

* * * * *